United States Patent Office 3,392,007
Patented July 9, 1968

3,392,007
FREE FLOWING FERTILIZER COATED WITH MAGNESIUM PHOSPHATE AND MAGNESIUM AMMONIUM PHOSPHATE AND METHOD OF MAKING
Ivan Christoffel, Hopewell, and Paul Nelson Strother, Jr., Chester, Va., assignors to Allied Chemical Corporation, New York, N.Y., a corporation of New York
No Drawing. Filed July 14, 1964, Ser. No. 382,653
11 Claims. (Cl. 71—33)

ABSTRACT OF THE DISCLOSURE

A free flowing coated fertilizer product and method of making same wherein an aqueous solution of phosphoric acid is applied onto individual particles of a fertilizer composition until they appear greyish in color. A mixture of magnesium oxide and ammonium phosphate is applied after each phosphoric acid application onto the particles so as to neutralize the phosphoric acid and form successive layers of coatings of magnesium phosphate and magnesium ammonium phosphate on the particles until said coatings contain a total amount ranging from about 25–60% by weight of the resultant fertilizer product.

---

This invention relates to a process for producing new waterproof fertilizer compositions which are non-burning to plants and do not release their nitrogen or other plant nutrient content to the soil at a rapid rate. This invention also relates to new waterproof fertilizer compositions produced by the process.

For several years much experimentation by agricultural technologists and agronomists has been conducted to prepare fertilizer compositions which do not release their nitrogen or other plant nutrient contents into the ground at a rapid rate but provide plant nutrient for an extended period of time. These fertilizers were to serve an added important purpose of obviating the burning experienced with high nitrogen content fertilizers. Ureaform was produced as a consequence of this research and provides a composition which obviates burning of plants and attains a fair percentage of its nitrogen content in water-insoluble form for release to the soil over an extended period of time. Ureaform, however, contains formaldehyde which is not a plant food. In addition, ureaform is at present expensive to produce, thus driving the price of the fertilizer upwards and making some of the cheaper but less suitable fertilizers more economically attractive.

It is an object of this invention, therefore, to produce new fertilizer compositions which maintain their nitrogen content in a manner in which the fertilizer is not readily solubilized by water.

It is a further object of this invention to provide a waterproof fertilizer composition which, when applied to the soil, will not cause burning or the like.

It is still a further object of this invention to provide a process for the production of such fertilizer compositions which process can be operated without the need for special apparatus and which is economically attractive.

These and other objects of this invention will become more apparent from the following more complete description and appended claims.

According to this invention, a fertilizer composition is waterproofed to maintain its nitrogen content or other plant food nutrient in a less water soluble form by adding to the fertilizer composition an aqueous solution of phosphoric acid containing about 75–95% by weight phosphoric acid with sufficient magnesium oxide to neutralize the phosphoric acid, together with sufficient ammonium phosphate to allow formation of magnesium ammonium phosphate, until the fertilizer is damp and continuing the addition of said phosphoric acid, magnesium oxide and ammonium phosphate until the desired waterproof coat is provided on the fertilizer composition. As a result there is provided a free flowing coated fertilizer composition, the coating comprising magnesium phosphate and being characterized by the presence of magnesium ammonium phosphate.

In a particularly desirable embodiment of coating by this invention, a fertilizer composition is waterproofed to maintain its nitrogen content or other plant food nutrient in a less water-soluble form by:

(1) Spraying onto the fertilizer composition an aqueous solution of phosphoric acid containing about 75–95% phosphoric acid, until the fertilizer is damp with the phosphoric acid solution;

(2) Dusting thereon at least sufficient magnesium oxide to neutralize the phosphoric acid, together with sufficient ammonium phosphate, preferably diammonium phosphate, to allow formation of 7–15% magnesium ammonium phosphate, based on the total weight of fertilizer product; and (3) Continuing the spraying of aqueous phosphoric acid with intermittent dusting of the treated composition with magnesium oxide and ammonium phosphate until the desired waterproofing coat is provided on the fertilizer composition.

In the preferred practice of our invention we employ as a fertilizer composition pelleted urea which is subsequently sprayed with an aqueous solution of phosphoric acid containing 75–95% by weight phosphoric acid until the urea is damp with the solution. If the aqueous phosphoric acid solution contains less than 75% by weight phosphoric acid it will tend to dissolve the fertilizer composition which will subsequently be present in the coating of the fertilizer composition and hence not protected from ready leaching due to rainfall when applied to the soil. Conversely, if the amount of phosphoric acid is greater than 95% by weight in the aqueous phosphoric acid solution, the acid will be too viscous to spread on to the fertilizer composition particles and hence the desired coating will not be sufficiently formed.

In our invention we can use ortho phosphoric acid such as is produced by the "wet process" of leaching phosphate rock with sulfuric acid. In addition, we can use pyro phosphoric acid together with the ortho phosphoric acid, although use of ortho phosphoric acid alone is preferred. The fertilizer composition should be made just damp with the phosphoric acid solution. Usually 5% by weight of the total amount of the phosphoric acid to be used during the process is sufficient to dampen the fertilizer composition and allow for subsequent formation of magnesium phosphate and magnesium ammonium phosphate which coats the fertilizer composition. If too much phosphoric acid is added to the fertilizer composition without the introduction of solid magnesium oxide or ammonium phosphate, the fertilizer particles will tend to agglomerate and become sticky and prevent ready formation of the water-insoluble coating thereon. Dampness can be determined in the case of urea by observing a change in color, i.e., a grayish color appears about the urea upon the addition of a small amount of phosphoric acid sufficient to merely dampen the urea.

After dampening the fertilizer composition, we then treat the so treated fertilizer composition, in the preferred practice of our invention, with a dust coating of at least sufficient magnesium oxide to neutralize the phosphoric acid, together with sufficient ammonium phosphate, preferably diammonium phosphate, to allow formation of 7–15% by weight magnesium ammonium phosphate, based on the total weight of the fertilizer composition and the coating itself. We then continue the spraying of aqueous phosphoric acid with intermittent dusting of the treated composition with a magnesium oxide and ammonium phosphate until the coating amounts preferably to 25–60% by weight of the total fertilizer product. As a result there is formed a fertilizer composition coated with magnesium phosphate, the coating being characterized by the presence of magnesium ammonium phosphate. The magnesium ammonium phosphate preferably present in an amount between 7 and 15% by weight based on the total weight of the fertilizer composition and the coating itself is present in the coating as a cement to insure that the magnesium phosphate coating sufficiently adheres and coats the fertilizer composition. If the amount of magnesium ammonium phosphate is less than about 7% by weight based on the total weight of the fertilizer composition on the coating itself, there will be in some instances an insufficient amount of magnesium ammonium phosphate "coating cement" and the resultant product will be characterized by a coating of magnesium phosphate which tends to break away from the fertilizer composition itself and hence is not preferred. On the other hand, the amount of the magnesium ammonium phosphate need not be greater than 15% by weight based on the total weight of the fertilizer composition and the coating itself since 15% by weight magnesium ammonium phosphate "coating cement" has been found to be sufficient to provide a good adhering water-insoluble coating of magnesium phosphate on the fertilizer composition. The product of our invention preferably has a coating of between 25 and 60% based on the total weight of the product. A coating of less than 25% is, in some instances, insufficient to prevent substantial water penetration into the fertilizer composition so coated over a long duration. Products having a coating of more than 60% based on the total weight of the product, while suitable for use, are relatively more expensive and a coating of more than 60% is not needed and in some cases may be too great to provide slow release of plant nutrient when the product is applied to the soil.

The coating operation is preferably carried out at 25–90° C. While temperatures below 25° C. (room temperature) can be employed, there is no necessity for using such temperatures and they only necessitate use of cooling which is disadvantageous. If the temperature exceeds 90° C. there is a greater tendency for the fertilizer composition to solubilize in the aqueous acid and hence not be coated but rather be present in the coating itself. In any event, the temperature should never exceed the melting point of the solid fertilizer composition, 132.7° C. in the case of urea.

In one modification of our process, acetone is added to the phosphoric acid to the extent of 10–200% and greater by weight of the phosphoric acid and the mixture is spread on to the fertilizer composition. The acetone appears to aid in spreading the phosphoric acid uniformly over the fertilizer and the acetone can be readily evaporated. Use of less than 10% acetone has little effect in spreading the phosphoric acid about the fertilizer composition particles and use of more than 200% by weight acetone is not needed and could represent an economical loss. Furthermore, if too much acetone is employed, the fertilizer composition may become too damp and tend to become sticky or to agglomerate.

In another modification of our invention small amounts of trace elements such as $Co_2O_3$, say 5–20% by weight based on the amount of magnesium oxide are employed together with magnesium oxide to provide the necessary trace elements for the soil needed in certain parts of the country. When using the trace elements it was discovered that there appears to be a synergistic effect in that the trace element or its compound helps to prevent leaching with water of the fertilizer composition so coated when placed in an aqueous solution.

As indicated above, we prefer to use as the ammonium phosphate ingredient to be added diammonium phosphate although the ammonium phosphate can be added as monoammonium phosphate or triammonium phosphate. We can even provide the ammonium phosphate by ammoniating the phosphoric acid added to dampen the fertilizer composition. This can be done by adding gaseous ammonia or the like, provided the ammoniating ingredient does not exceedingly dampen the fertilizer composition so that it tends to become too sticky or to agglomerate.

In our process, we can also add magnesium oxide and the ammonium phosphate together with the phosphoric acid gradually so that the fertilizer composition does not become too damp. We continue the addition of these ingredients together until the magnesium oxide reacts with the phosphoric acid to form the magnesium phosphate coating and until the magnesium oxide reacts with the phosphoric acid and the ammonium phosphate to form the magnesium ammonium phosphate "coating cement."

Still another method of performing our process is to add a small amount of magnesium oxide and ammonium phosphate, say 5% based on the amount of fertilizer composition present, and then subsequently thereto add the phosphoric acid to dampen the fertilizer composition and commence reaction with the solid ingredients and then to intermittently continue to add magnesium oxide and ammonium phosphate with alternate addition or spraying of phosphoric acid to form the coating and the "coating cement."

Fertilizer compositions which can be coated according to the present invention include those which are both water-insoluble and water-soluble. However, no particular advantage is provided in coating water-insoluble fertilizer compositions, as these compositions do not release their nitrogen rapidly to the soil and thus do not need the waterproofing provided by our process. The size of the fertilizer particles employed in our process is not critical although we prefer that the products have a Tyler mesh screen size of between 8 and 12. Fertilizer compositions having a size larger than 8 mesh can be readily coated according to our process but larger particles tend to give too high concentration of fertilizer at a particular point when applied to the soil. Fertilizer compositions having a Tyler mesh screen size smaller than 12 require more coating material to provide the same water-insolubility as compositions lying within the preferred range. This is due to the larger total area of these particles.

In performing our process of our invention, we have found that urea pellets having a coating of 56% based on weight of the product provide an attractive leach pattern on the product. Specifically, a free-flowing pelleted urea product having a coating of 56%, based on the weight of the product, after soaking in water for seven days was found to have 40% of its pellets intact. The same product on further testing revealed 5% of its coated pellets intact after 21 days of soaking in water.

Rate of release of fertilizer nutrients to the soil can be controlled or regulated by the thickness of the coating. This means that fertilizers can be tailored for different rates of release to suit specific climates.

Agronomic tests indicate that even in contact with seeds the coated fertilizers do not delay germination or reduce the stands. During the seeding stage, while root systems are small and plant demands are limited, the urea or other water-soluble plant nutrient is safe from leaching or washing away with surface run-off. As the plants mature, nutrients are available in supply adequate for maximum growth.

In order to more fully illustrate the nature of our invention and the manner of practicing the same, the following examples are presented.

EXAMPLE I

Pelleted urea (600 grams) of about 8–10 Tyler mesh size was placed in a one foot diameter by four inches wide rotating cylinder. The cylinder was fitted with five 1-inch flights, and a plexiglass cover with a ¾-inch opening in the center. Eighty-five percent by weight phosphoric acid (464 grams) and a mixture of reagent grade MgO (266 grams) and reagent grade diammonium phosphate (133 grams) were alternately fed onto the tumbling urea through the opening. In doing this, enough phosphoric acid was added at a time so that the pellets were wetted to a grey color but not to the extent that the pellets clumped together or the walls of the cylinder became wet. Temperature during application of the coating was 45° C. Weight of recovered encapsulated or coated product was 1377 grams. Coating amounted to 56% of the product. In order to ascertain the character of the coating, a sample was ground and analyzed as follows:

|  | Wt. percent found |
|---|---|
| Total $P_2O_5$ | 23.5 |
| $H_2O$ soluble $P_2O_5$ | 1.3 |
| Citrate soluble $P_2O_5$ | 23.5 |
| Magnesium | 10.8 |
| $MgNH_4PO_4$ | 14.1 |

Expressed as percentage of the coat, $MgNH_4PO_4$ amounted to about 25% by weight.

The degree of waterproofness of the encapsulated product was demonstrated by placing about 10 grams of product in 50 ml. of water at room temperature and withdrawing 10 pellets at intervals and breaking the pellets to see if they contained solid urea. The following results were obtained:

Percent of pellets containing solid urea after soaking

| Days: | |
|---|---|
| 1 | 100 |
| 3 | 80 |
| 7 | 40 |
| 21 | 5 |

Applied to lawn grass at a rate of 500 pounds urea N per acre, the fertilizer was nonburning compared to severe burning observed with uncoated urea. Pellets were withdrawn during the lawn test and examined for durability as follows:

Percent of pellets containing solid urea after

| Days: | |
|---|---|
| 5 | 100 |
| 7 | 80 |
| 12 | 70 |
| 21 | 10 |

During this twenty-one day period the grass and pellets were wetted daily by dew and occasionally by rain during hot summer weather.

EXAMPLE II

Using the same coating apparatus as in Example I urea (400 grams) was coated by alternate application of a mixture of 85% $H_3PO_4$ (180 grams), $H_2O$ (25 grams) and acetone (277 grams) and a mixture of commercial grade MgO (172 grams) and a diammonium phosphate (108 grams) at a temperature of 25° C. over a period of 1.5 hours. Weight of product obtained was 773 grams. The percentage coating amounted to 48%. The degree of waterproofness was tested as follows:

Percent of pellets containing solid urea after soaking in water

| Days: | |
|---|---|
| 1 | 90 |
| 3 | 90 |
| 5 | 55 |
| 7 | 55 |
| 11 | 15 |

EXAMPLE III

Using the same coating apparatus as in Example I, urea (400 grams) was coated by alternate application of 85% $H_3PO_4$ (180 grams) and a mixture of MgO (163 grams), diammonium phosphate (108 grams) and $Co_2O_3$ (9 grams) at 25° C. over a period of 1.5 hours. Weight of product obtained was 829 grams. The percentage coating amounted to 52%. The degree of waterproofness was tested as follows:

Percent of pellets containing solid urea after soaking in water

| Days: | |
|---|---|
| 1 | 85 |
| 3 | 80 |
| 7 | 80 |
| 14 | 70 |
| 21 | 20 |

It is noted that the presence of cobalt oxide in the coating provided a synergistic effect and the solubilization of the coated urea was inhibited apparently due to the presence of the cobalt oxide.

EXAMPLE IV

A lawn grass plot was fertilized with coated urea prepared in Example I at the rate of 500 pounds urea nitrogen per acre. Another plot was also fertilized at the same rate with uncoated urea. The following tabulation shows approximate rate of burning noted:

| Type of Fertilizer | Percent of Grass Area Burned After— | | | | |
|---|---|---|---|---|---|
|  | 1 Day | 4 Days | 5 Days | 7 Days | 12 Days |
| Phosphate coated urea | None | 5 | 5 | None | None |
| Uncoated urea | 5 | 40–50 | 40–50 | 20–30 | 10 |

EXAMPLE VI

This example demonstrates continuous operation of the process. It also demonstrates that a mixture of ortho phosphoric acid and pyro phosphoric acid can be utilized.

The phosphoric acid mixture used in this example consisted of 25 weight percent of so-called super phosphoric acid and 75 weight percent of wet process phosphoric acid containing 85% by weight ortho phosphoric acid. Super phosphoric acid contains 76% phosphorous pentoxide (105% phosphoric acid equivalent) and is a liquid at room temperature; 49% of the pentoxide in the super phosphoric acid is present as ortho phosphoric acid, 42% as pyro phosphoric acid and 9% as higher polyphosphoric acid.

About 300 grams of pelleted urea was tumbled in the vessel described in Example I. About 172 grams of the phosphoric acid mixture described above was sprayed continuously over a period of 25 minutes onto the urea pellets while at the same time 129 grams of a mixture of two parts by weight magnesium oxide and one part by weight diammonium phosphate was added to the tumbling mixture by means of a screw feeder. The resulting waterproof fertilizer product was uniformly coated and free-flowing.

EXAMPLE VII

Using the same coating apparatus as in Example I, 400 grams of a pelleted 28–14–14 fertilizer consisting of 54.3% urea, 23.1% KCl and 22.5% mono ammonium phosphate, screened to −8+10 Tyler mesh is coated by alternate application of a mixture of 180 grams of 85% $H_3PO_4$, and a mixture of 172 grams commercial grade MgO and 108 grams diammonium phosphate at a temperature of 25° C. over a period of 1.5 hours. Weight of product obtained is about 830 grams. This product is particularly useful as a lawn fertilizer because of its slow release of nitrogen and other plant nutrient to the soil.

From the foregoing it is apparent that we have provided a significant contribution in the art of slow release fertilizer compositions and particularly to the art of coated fertilizers. More specifically, we have provided a new fertilizer composition which maintains its nitrogen or other plant nutrient content in a manner in which the fertilizer is not readily solubilized by water and we have also provided a fertilizer composition which does not cause burning or the like. Moreover, we have provided a coated fertilizer composition wherein the coating itself has an agronomic value in addition to the core of the fertilizer product. Furthermore, we have provided simple and economic processes of the production of the same which processes do not necessitate the use of expensive equipment, high temperatures or pressures or expensive chemicals.

The above disclosure has been set forth herein in order to illustrate the nature of this invention and the manner of practicing the same and it should not be construed as limiting the scope of our invention since certain modifications or departures from the above disclosure will become obvious to those skilled in the art in view of the teachings herein.

We claim:

1. A method of water-proofing a fertilizer composition to maintain its plant food nutrient in a less water soluble form, which comprises:
   (a) forming a tumbling bed of starting fertilizer composition materials;
   (b) applying an aqueous solution of phosphoric acid containing about 75%–95% by weight of phosphoric acid onto the individual particles until said particles appear greyish in color thereby indicating a sufficient moistening of said particles;
   (c) applying a mixture of magnesium oxide and ammonium phosphate onto the particles in an amount of about 5% by weight of the fertilizer composition then present so as to neutralize the phosphoric acid and form a coating of magnesium phosphate and from 7-15% magnesium ammonium phosphate on the particles; and
   (d) repeating the steps recited in (b) and (c) so as to form successive layers of magnesium ammonium phosphate coatings on each of the particles until said successive coating layers contain a total amount ranging from about 25–60% by weight of the resultant fertilizer product.

2. A process according to claim 1 wherein said ammonium phosphate is diammonium phosphate.

3. A process according to claim 1 wherein the coating operation is performed at temperatures between 25 and 90° C.

4. A process according to claim 1 wherein between 5% and 20% by weight of a trace element based on the amount of magnesium oxide is mixed with the magnesium oxide.

5. A process according to claim 1 wherein acetone is mixed with phosphoric acid in amounts between 10% and 200% by weight of the phosphoric acid.

6. A process according to claim 1 wherein said aqueous solution of phosphoric acid contains ortho phosphoric acid together with pyro phosphoric acid.

7. A free flowing coated fertilizer product comprising a starting fertilizer composition cementitiously coated with magnesium phosphate, the coating being characterized by the presence therein of magnesium ammonium phosphate having an amount of at least 7% by weight of the resultant fertilizer product.

8. A free flowing fertilizer product according to claim 7 wherein said magnesium ammonium phosphate is present in an amount between 7% and 15% based on the total weight of the fertilizer product.

9. A free flowing coated fertilizer product according to claim 8 wherein the coating amounts to between 25% and 60% by weight of the total fertilizer product.

10. A free flowing coated fertilizer product according to claim 9 wherein said fertilizer composition is urea.

11. A free flowing coated fertilizer product according to claim 10 wherein said coating contains between 5% and 20% $Co_2O_3$ based on the amount of magnesium present calculated as magnesium oxide.

References Cited

UNITED STATES PATENTS

| | | | |
|---|---|---|---|
| 2,963,359 | 12/1960 | Moore et al. | 71—64 X |
| 3,053,622 | 9/1962 | Bostwick | 71—64 X |
| 3,181,943 | 5/1965 | Bridger et al. | 71—64 X |

S. LEON BASHORE, *Acting Primary Examiner.*

DONALL H. SYLVESTER, *Examiner.*

T. D. KILEY, R. BAJEFSKY, *Assistant Examiners.*